US011945404B2

(12) United States Patent
Pham

(10) Patent No.: US 11,945,404 B2
(45) Date of Patent: Apr. 2, 2024

(54) TRACKING AND VIDEO INFORMATION FOR DETECTING VEHICLE BREAK-IN

(71) Applicant: Toyota Motor Engineering & Manufacturing North America, Inc., Plano, TX (US)

(72) Inventor: Alex T. Pham, San Jose, CA (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 391 days.

(21) Appl. No.: 16/856,532

(22) Filed: Apr. 23, 2020

(65) Prior Publication Data
US 2021/0331648 A1 Oct. 28, 2021

(51) Int. Cl.
| G08B 13/196 | (2006.01) |
| B60R 25/102 | (2013.01) |
| B60R 25/30 | (2013.01) |
| B60R 25/31 | (2013.01) |
| G01S 17/66 | (2006.01) |
| G01S 17/88 | (2006.01) |
| G06F 16/9537 | (2019.01) |
| H04L 67/1097 | (2022.01) |

(52) U.S. Cl.
CPC ............ *B60R 25/31* (2013.01); *B60R 25/102* (2013.01); *B60R 25/305* (2013.01); *G01S 17/66* (2013.01); *G01S 17/88* (2013.01); *G06F 16/9537* (2019.01); *G08B 13/19645* (2013.01); *G08B 13/19647* (2013.01); *H04L 67/1097* (2013.01); *B60R 2325/205* (2013.01)

(58) Field of Classification Search
CPC ..... B60R 25/31; B60R 25/102; B60R 25/305; B60R 2325/205; G06F 16/9537; G01S 17/66; G01S 17/88; H04L 67/1097; G08B 13/19645; G08B 13/19647
See application file for complete search history.

(56) References Cited

U.S. PATENT DOCUMENTS

| 5,973,996 A * | 10/1999 | Zhevelev | G01S 15/523 367/99 |
| 6,198,431 B1 * | 3/2001 | Gibson | G01S 19/19 342/357.57 |
| 6,340,935 B1 * | 1/2002 | Hall | G08G 1/142 340/905 |
| 6,879,247 B2 | 4/2005 | Shimomura et al. | |

(Continued)

FOREIGN PATENT DOCUMENTS

| JP | 2005029138 A | 2/2005 |
| KR | 100820112 B1 | 4/2008 |

*Primary Examiner* — Nay Tun
(74) *Attorney, Agent, or Firm* — Dinsmore & Shohl LLP

(57) ABSTRACT

The present specification relates to systems and methods capable of detecting and tracking a perpetrator of the vehicle break-in. In one embodiment, a computer-implemented method of tracking a perpetrator of a break-in in a vehicle is disclosed. The method includes detecting, using one or more sensors, that the vehicle has been broken in and monitoring the perpetrator during the break-in using in-vehicle data from the one or more sensors. The method further includes receiving the crowdsourced data on the perpetrator and combining the in-vehicle data and the crowdsourced data to form an integrated data set. Finally, the method tracks the perpetrator using the integrated data set.

21 Claims, 6 Drawing Sheets

(56) References Cited

U.S. PATENT DOCUMENTS

| | | | |
|---|---|---|---|
| 7,129,838 B2 | 10/2006 | Shimomura et al. | |
| 9,327,685 B1* | 5/2016 | Wooten | B60R 25/102 |
| 9,443,151 B2* | 9/2016 | Yoo | G06V 20/52 |
| 9,871,692 B1* | 1/2018 | Hutz | G08B 27/003 |
| 9,965,936 B1* | 5/2018 | Epps | G08B 21/02 |
| 10,048,753 B1* | 8/2018 | Brooks | G06F 3/011 |
| 10,055,771 B2* | 8/2018 | Fish | G06V 20/20 |
| 10,166,991 B1* | 1/2019 | Bai | G08G 1/0112 |
| 10,354,265 B2* | 7/2019 | Patsiokas | G06Q 30/0261 |
| 10,431,089 B1* | 10/2019 | Nguyen | G07C 5/02 |
| 10,584,971 B1* | 3/2020 | Askeland | G01C 21/30 |
| 10,636,282 B2* | 4/2020 | Cruz Huertas | G08B 13/00 |
| 11,217,076 B1* | 1/2022 | Siminoff | H04N 7/181 |
| 11,315,396 B2* | 4/2022 | Kaindl | G01S 13/87 |
| 2005/0073436 A1* | 4/2005 | Negreiro | G08G 1/017 |
| | | | 348/148 |
| 2005/0099273 A1* | 5/2005 | Shimomura | B60R 25/305 |
| | | | 348/148 |
| 2006/0012679 A1* | 1/2006 | Ressler | G08B 13/1961 |
| | | | 348/148 |
| 2007/0109107 A1 | 5/2007 | Liston | |
| 2008/0012693 A1 | 1/2008 | Shimomura | |
| 2009/0309709 A1* | 12/2009 | Bevacqua | H04W 12/126 |
| | | | 340/426.18 |
| 2010/0315508 A1* | 12/2010 | Lee | G08B 13/19645 |
| | | | 340/541 |
| 2011/0285851 A1* | 11/2011 | Plocher | G08B 13/19645 |
| | | | 340/541 |
| 2013/0316685 A1* | 11/2013 | Bansal | H04W 64/00 |
| | | | 455/436 |
| 2013/0342333 A1* | 12/2013 | Hutchings | G08B 13/19647 |
| | | | 348/148 |
| 2016/0050037 A1* | 2/2016 | Webb | G08B 27/005 |
| | | | 455/3.01 |
| 2016/0057335 A1* | 2/2016 | Pisz | G08G 1/096775 |
| | | | 348/149 |
| 2016/0272112 A1* | 9/2016 | DeGrazia | B60Q 9/00 |
| 2017/0017734 A1* | 1/2017 | Groh | G06F 30/20 |
| 2017/0257602 A1* | 9/2017 | Axson | G08B 13/19689 |
| 2017/0322558 A1* | 11/2017 | Teshima | B60Q 3/20 |
| 2018/0018681 A1* | 1/2018 | Locke | H04N 13/204 |
| 2018/0103348 A1* | 4/2018 | Malone | H04W 64/003 |
| 2019/0278976 A1* | 9/2019 | Khadloya | G08B 13/194 |
| 2019/0311558 A1* | 10/2019 | Bika | G07C 5/0841 |
| 2020/0151585 A1* | 5/2020 | Ishida | G06V 10/82 |
| 2020/0216022 A1* | 7/2020 | Cheng | H04W 4/40 |
| 2021/0014654 A1* | 1/2021 | Gupta | H04L 67/303 |
| 2022/0126864 A1* | 4/2022 | Moustafa | B60W 60/001 |

* cited by examiner

_US 11,945,404 B2_

TRACKING AND VIDEO INFORMATION FOR DETECTING VEHICLE BREAK-IN

TECHNICAL FIELD

The present specification generally relates to provisioning of tracking and video information for detecting a vehicle break-in and more specifically, to systems and methods capable of detecting and tracking a perpetrator of the vehicle break-in.

BACKGROUND

Anti-theft devices designed to detect the occurrence of illegal activity by a third party to a vehicle are generally known. Examples of illegal activity by a third party to a vehicle, generally known as a vehicle break-in, include: attempting to open a vehicle door or a trunk lid other than by use of an authorized key, attempting to break a window glass of a vehicle, attempting to move a vehicle itself using a wrecker, tow truck or the like, or the case in which a third party attempts to start an engine other than by use of an authorized key. These anti-theft devices however, are not known to detect and track the individual or entity perpetrating the vehicle break-in well beyond the time of the break-in.

Accordingly, it is desirable to have methods and systems that can detect an individual or entity that damaged and/or broke into or stole from a vehicle and track them well beyond the time of the break-in.

SUMMARY

The present specification relates to systems and methods capable of detecting and tracking a perpetrator of the vehicle break-in. In one embodiment, a computer-implemented method of tracking a perpetrator of a break-in in a vehicle is disclosed. The method includes detecting, using one or more sensors, that the vehicle has been broken in and monitoring the perpetrator during the break-in using in-vehicle data from the one or more sensors. The method further includes receiving the crowdsourced data on the perpetrator and combining the in-vehicle data and the crowdsourced data to form an integrated data set. Finally, the method tracks the perpetrator using the integrated data set.

In another embodiment, a system of tracking a perpetrator of a break-in in a vehicle, is disclosed. The system includes a vehicle including one or more sensors configured to detect the break-in and a computing device. The computing device includes a processor, a non-transitory computer readable memory, and a machine-readable instruction set stored in the non-transitory computer-readable memory that, when executed by the processor, causes the system to perform a method having a number of steps. The method includes detecting, using one or more sensors, that the vehicle has been broken in and monitoring the perpetrator during the break-in using in-vehicle data from the one or more sensors. The method further includes receiving the crowdsourced data on the perpetrator and combining the in-vehicle data and the crowdsourced data to form an integrated data set. Finally, the method tracks the perpetrator using the integrated data set.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein relate to systems and methods capable of detecting and tracking a perpetrator of a vehicle break-in. The system uses data from in-vehicle sensors to detect and monitor the vehicle break-in. The data from the in-vehicle sensors is integrated with crowdsourced data requested from a variety of sources in the surrounding areas of the vehicle such as, but not limited to, vehicles, infrastructural entities, edge servers, and local servers, which detect and monitor the perpetrator after the vehicle break-in. The integrated data from the in-vehicle sensors and the crowdsourced data is used to track the perpetrator, develop information on the path taken by the perpetrator before and after the break-in, and provide notification to law enforcement and/or a registered user of the vehicle broken in. Various other aspects of the disclosure and variations thereof are illustrated or implied through the descriptions of the embodiments below.

As used herein, the following terms are generally defined in the manner below. The term "communicatively coupled" means that coupled components are capable of exchanging data signals with one another such as, for example, electrical signals via conductive medium, electromagnetic signals via air, optical signals via optical waveguides, and the like. The term "perpetrator" refers to an individual or entity that damaged and/or broke into or stole from a vehicle. The term "sensor network" refers to a network of sensing devices (for example, cameras) coupled to vehicles or infrastructural entities configured to sense and capture information through the sensing devices. The term "edge server" refers to a server associated with a sensor network and configured to store and/or process information captured through the sensing devices in the sensor network. The term "local server" refers to a server within an area covered by a plurality of sensor networks and configured to store and/or process information uploaded by edge servers associated with individual sensor networks in the plurality of sensor networks.

Figure 1:
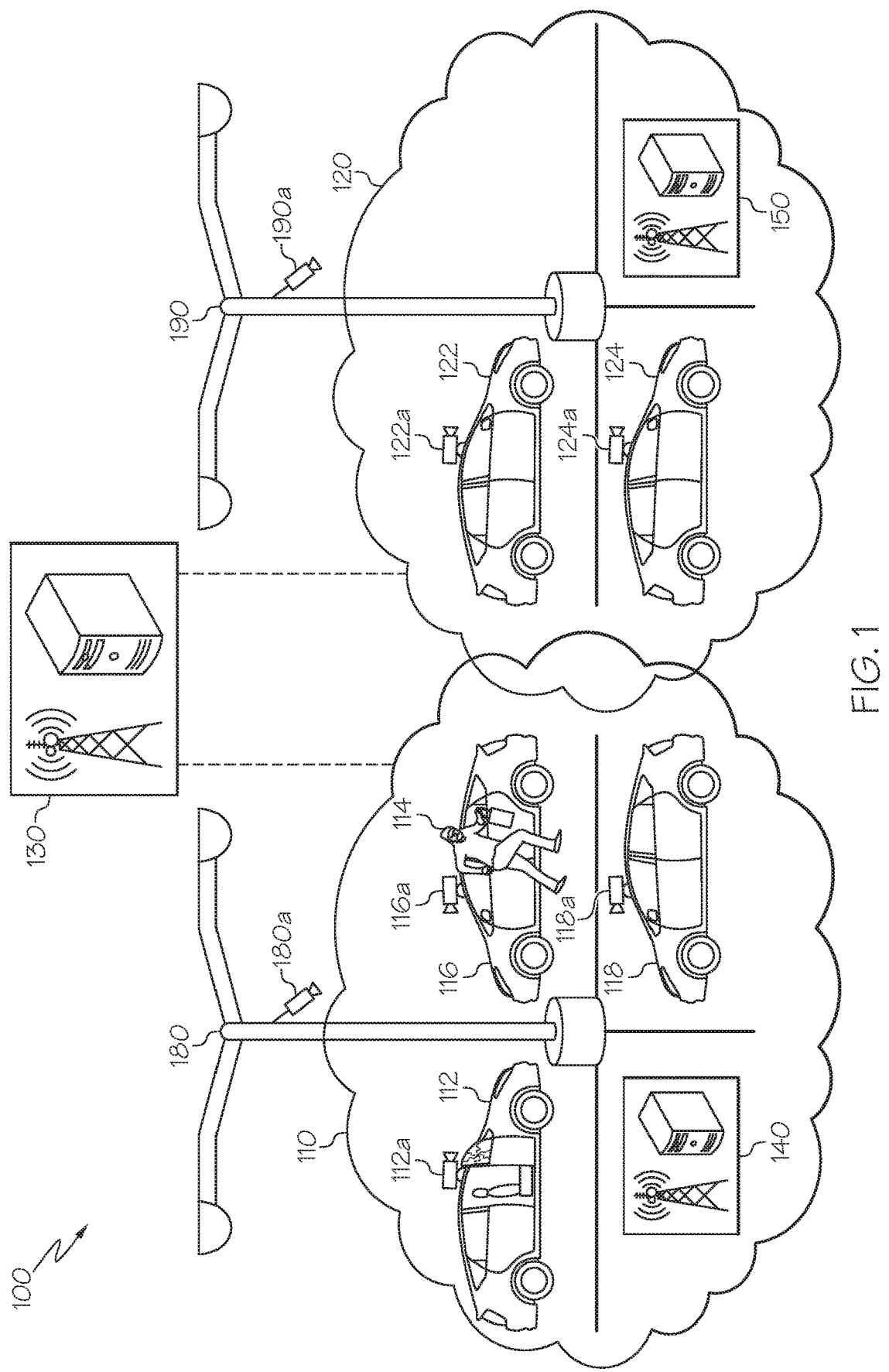
FIG. 1 depicts a system of tracking a perpetrator of a break-in in a vehicle, according to one or more embodiments shown and described herein.
Figure 2:
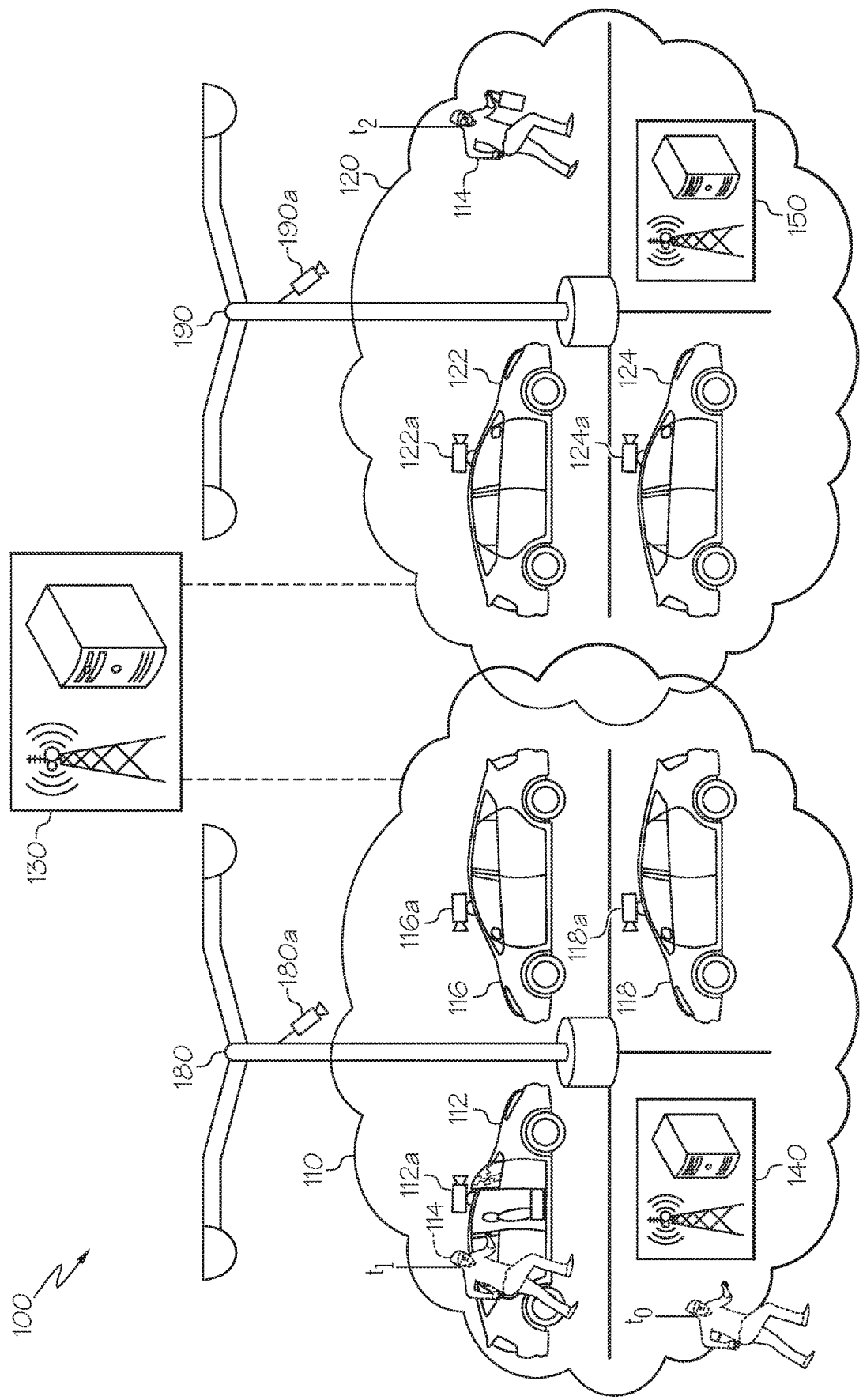
FIG. 2 depicts an exemplary scenario of the system of FIG. 1 depicting the perpetrator before, during, and after the vehicle break-in, according to one or more embodiments shown and described herein.

Referring to the figures, FIG. 1 depicts a system 100 of tracking a perpetrator 114 of a break-in in a vehicle 112 (located in a parking lot or a street side, for example), while FIG. 2 depicts an exemplary scenario of the system 100 depicting the perpetrator 114 before, during, and after the vehicle break-in. In the non-limiting embodiment shown in FIGS. 1-2, the system 100 includes vehicles 112, 116, and 118, a street light 180 as well as an edge server 140 as part of a first sensor network 110 and vehicles 122 and 124, a street light 190 as well as an edge server 150 as part of a second sensor network 120, which overlaps with the first sensor network 110. The first sensor network 110 and the second sensor network 120 are further communicatively connected to a local server 130. During the process of tracking the perpetrator 114, as the perpetrator 114 moves out of a sensing distance of sensors in the first sensor network 110, the perpetrator 114 comes within sensing distance of sensors in the second sensor network 120 and is thus continuously tracked as he flees the scene of the break-in.

Individual vehicles 112, 116, 118 have cameras 112a, 116a, 118a respectively. The street light 180 has a camera 180a. The cameras 112a, 116a, 118a, and 180a may be configured to capture internal and external images of the individual vehicles 112, 116, 118 and external images of the street light 180 respectively. The external images capture the surroundings of the individual vehicles 112, 116, 118 and the street light 180 within the first sensor network 110. Individual vehicles 112, 116, 118 may also include other kinds of sensors (not shown) such as, but not limited to, an infrared sensor, a LIDAR (LIght Detection And Ranging) sensor, an impact sensor (for example, a glass breakage detector, unauthorized entry detector, etc.) and a proximity sensor. The cameras 112a, 116a, 118a as well as the other kinds of sensors may be configured to detect a break-in of the individual vehicles 112, 116, 118 respectively. The external images captured by the cameras 112a, 116a, 118a and 180a may be transmitted to the edge server 140 for further use as detailed below. The external images captured by the cameras 112a, 116a, 118a and 180a may also be transmitted and stored in the local server 130.

Individual vehicles 122, 124 and the street light 190 have cameras 122a, 124a, and 190a respectively. The cameras 122a, 124a, and 190a may be configured to capture internal and external images of the individual vehicles 122, 124, and external images of the street light 190 respectively. The external images capture the surroundings of the individual vehicles 122, 124, and the street light 190 within the second sensor network 130. Individual vehicles 122, 124 may also include other kinds of sensors (not shown) such as, but not limited to, an infrared sensor, a LIDAR (LIght Detection And Ranging) sensor, an impact sensor (for example, a glass breakage detector, unauthorized entry detector, etc.) and a proximity sensor. The cameras 122a, 124a as well as the other kinds of sensors may be configured to detect a break-in of the individual vehicles 122, 124 respectively. The external images captured by the cameras 122a, 124a, and 190a may be transmitted to the edge server 150 for further use as detailed below. The external images captured by the cameras 122a, 124a, and 190a may also be transmitted and stored in the local server 130.

Individual cameras 112a, 116a, 118a, 122a, 124a, 180a, 190a may be any device having an array of sensing devices (e.g., pixels) capable of detecting radiation in an ultraviolet wavelength band, a visible light wavelength band, or an infrared wavelength band and configured to detect location and direction of movement of the perpetrator using image-based depth estimation. Individual cameras 112a, 116a, 118a, 122a, 124a, 180a, 190a may have any resolution. Individual cameras 112a, 116a, 118a, 122a, 124a, 180a, 190a may include an omni-directional camera, or a panoramic camera and have one or more optical components, such as a mirror, fish-eye lens, or any other type of lens may be optically coupled thereto.

While in the non-limiting example shown in FIGS. 1-2, the first sensor network 110 and the second sensor network 120 includes only vehicles 112, 116, 118, 122, 124 and street lights 180, 190, in different embodiments, individual sensor networks may include a wide variety of other infrastructural entities such as, but not limited to, a traffic light, a home security camera, a roadside camera, and a mobile phone of a user configured to capture images of surroundings of the vehicles 112, 116, 118, 122, 124 within the individual sensor networks 110, 120. While in the non-limiting example shown in FIGS. 1-2, the individual sensor networks 110, 120 include three vehicles and a street light and two vehicles and a street light respectively, there may be more or less number of vehicles, street lights and other infrastructural entities in different embodiments. There may also be more than one edge server 140, 150 within individual sensor networks 110, 120. Further, in different embodiments, individual vehicles, street lights and other infrastructural entities may have more than one camera or sensors for capturing information on the perpetrator 114.

Figure 4:
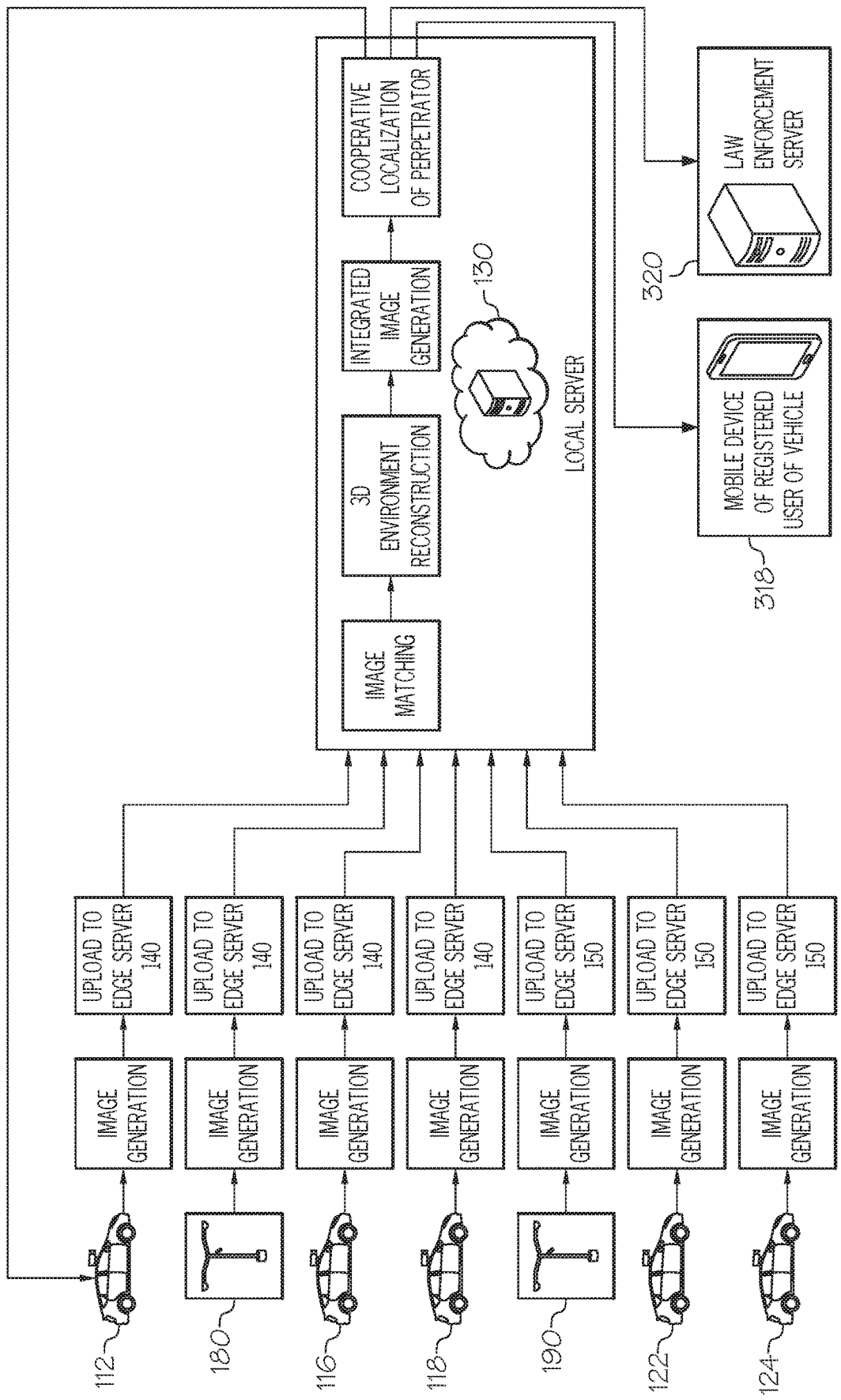
FIG. 4 depicts a schematic process for crowdsourcing data for tracking the perpetrator and reconstructing a 3D tracking image of the path of the perpetrator, according to one or more embodiments shown and described herein.

The vehicles 112, 116, 118, 122, 124 as well as the other infrastructural entities, edge servers, and local servers form a plurality of data sources within the respective sensor network that are configured to provide data such as, but not limited to, a stream of images of the surroundings thereof to the local server 130. The data from the plurality of data sources is then crowdsourced at the local server 130 and configured to be transmitted as necessary, for example as shown in FIG. 4.

In some embodiments, the individual sensor networks 110, 120 may be defined by location of the plurality of data sources within a threshold radius (for example, 1000 feet, 2000 feet, etc.) of the individual vehicles 112, 116, 118, 122, 124. In other embodiments, the individual sensor networks 110, 120 may be dynamically formed based on availability of cameras and other sensors, requirements for tracking the perpetrator 114, and the like. An example handover process between individual sensor networks 110, 120 as the perpetrator 114 flees the scene, is shown and described with regard to FIG. 5.

Figure 3:
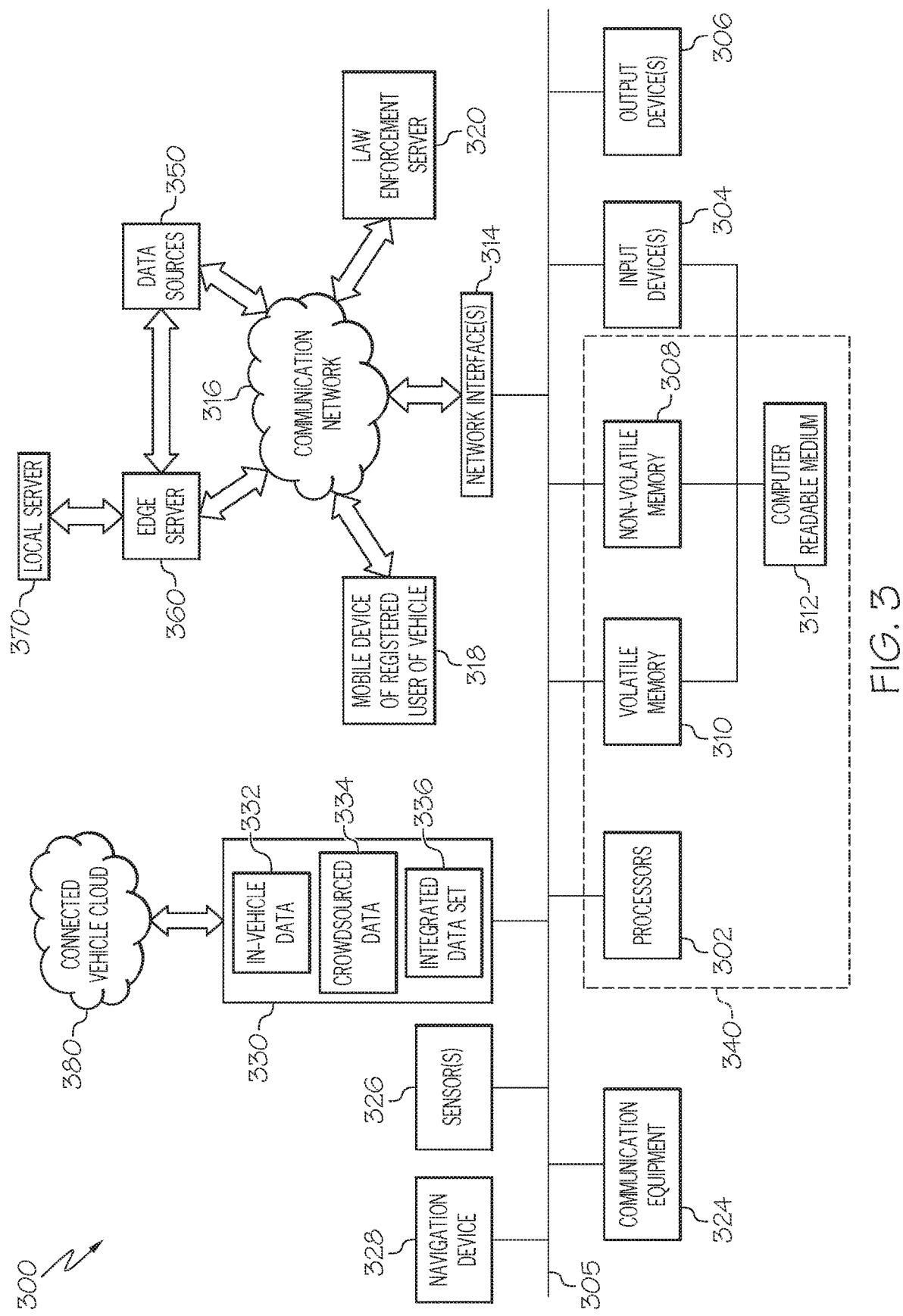
FIG. 3 depicts a block diagram illustrating a computer system utilized in the vehicle of FIG. 1 for implementing various systems and processes, according to one or more embodiments shown and described herein.

Individual vehicles 112, 116, 118, 122, 124 in the system 100 further includes a computer system 300, as depicted in the block diagram shown in FIG. 3. The computer system 300 includes one or more processors 302, one or more input devices 304, one or more output devices 306, and a communication path 305. The computer system 300 further includes a non-volatile memory 308 and/or a volatile memory 310 connected to a computer-readable medium 312, and a network interface 314. The one or more processors 302, the non-volatile memory 308 and/or the volatile memory 310, and the computer-readable medium 312 form a computing device 340 in the computer system 300. As depicted in FIG. 1, the computer system 300 is also connected, along the communication path 305, to communication equipment 324, sensors 326, a navigation device 328, and a database 330.

The processor(s) 302 may be any device capable of executing a machine-readable instruction set stored in a computer-readable memory such as the non-volatile memory 308 and/or the volatile memory 310. Accordingly, the processor(s) 302 may be an electronic controller, an integrated circuit, a microchip, a computer, or any other computing device. The processor(s) 302 is communicatively coupled to the other components of the computer system 300 by the communication path 305, which communicatively couples any number of the processor(s) 302 with one another, and allows the other components to operate in a distributed computing environment. Specifically, each of the components may operate as a node that may send and/or receive data.

The input device(s) 304 may include, by way of example, any type of microphone, mouse, keyboard, disk/media drive, memory stick/thumb-drive, memory card, pen, touch-input device, biometric scanner, voice/auditory input device, motion-detector, camera, scale, etc. The output device(s) 306 may include a video display as well as speakers, headphones, projectors, wearable-displays, holographic displays, a heads-up display (HUD), and/or printers, for example. The output device(s) 306 may be configured to output information to a user or driver of the vehicle having the computer system 300.

The communication path 305 is formed from any medium that is capable of transmitting a signal such as, for example, conductive wires, conductive traces, optical waveguides, or the like. The communication path 305 may also refer to the expanse in which electromagnetic radiation and their corresponding electromagnetic waves traverses. Moreover, the communication path 305 may be formed from a combination of mediums capable of transmitting signals. In one embodiment, the communication path 305 comprises a combination of conductive traces, conductive wires, connectors, and buses that cooperate to permit the transmission of electrical data signals to and from the various components of the computer system 300. Accordingly, the communication path 305 may comprise a bus, such as for example a LIN bus, a CAN bus, a VAN bus, and the like. Additionally, it is noted that the term "signal" means a waveform (e.g., electrical, optical, magnetic, mechanical or electromagnetic) capable of traveling through a medium such as DC, AC, sinusoidal-wave, triangular-wave, square-wave, vibration, and the like, capable of traveling through a medium.

In some embodiments, the processor(s) 302 is communicatively coupled to the non-volatile memory 308 and/or the volatile memory 310. The non-volatile memory 308 may comprise read-only memory (ROM), flash memories, hard drives, while the volatile memory 310 may comprise random access memory (RAM). The non-volatile memory 308 and/or volatile memory 310 may be configured to store a machine-readable instruction set that can be accessed and executed by the processor(s) 302. The machine-readable instruction set may comprise logic or algorithm(s) written in any programming language of any generation (e.g., 1GL, 2GL, 3GL, 4GL, or 5GL) such as, for example, machine language that may be directly executed by the processor(s) 302, or assembly language, object-oriented programming (OOP), scripting languages, microcode, etc., that may be compiled or assembled into machine readable instructions and stored in the non-volatile memory 308 and/or the volatile memory 310. Alternatively, the machine-readable instruction set may be written in a hardware description language (HDL), such as logic implemented via either a field-programmable gate array (FPGA) configuration or an application-specific specific integrated circuit (ASIC), or their equivalents. Accordingly, the functionality described herein may be implemented in any conventional computer programming language, as pre-programmed hardware elements, or as a combination of hardware and software components.

The processor(s) 302 in the computer system 300 processes the information detected by the sensors 326 using processing algorithms stored in the non-volatile memory 308 and/or the volatile memory 310. In some embodiments, images captured by the sensors 306 may be processed using one or more image processing and image segmentation algorithms. Any known or yet-to-be developed video and image processing algorithms may be applied to the images in order to identify the perpetrator 114 or determine a location of an object or other vehicles relative to other items in the surrounding environment of the vehicle 112, 116, 118, 122, 124 etc. having the computer system 300. Example video and image processing algorithms include, but are not limited to, kernel-based tracking (mean-shift tracking) and contour processing algorithms. In general, video and image processing algorithms may detect objects and movement from sequential or individual frames of images.

One or more object recognition algorithms may be applied to the images to estimate three-dimensional objects to determine their locations relative to each other. For example, structure from motion, which is a photogrammetric range imaging technique for estimating three-dimensional structures from image sequences, may be used. Additionally, any known or yet-to-be-developed object recognition algorithms may be used to extract the objects, edges, dots, bright spots, dark spots or even optical characters and/or image fragments from the images. For example, object recognition algorithms may include, but are not limited to, scale-invariant feature transform ("SIFT"), speeded up robust features ("SURF"), edge-detection algorithms, and vision algorithms based on deep-learning convolutional neural network model (DCNN).

Further, one or more image segmentation algorithms may be also used to process the image data generated by the sensors 326. Example segmentation algorithms include, but are not limited to, thresholding algorithms, clustering algorithms, edge-detection algorithms, region-growing algorithms, and dual clustering algorithms. Other example segmentation techniques or algorithms include region-based semantic segmentation, fully convolutional network (FCN)-based semantic segmentation, and weakly supervised semantic segmentation. Embodiments utilizing region-based semantic segmentation may provide semantic based results based on object classification. FCN-based semantic segmentation may classify pixels at an individual level and can be applied to any size image. Weakly supervised semantic segmentation may exploit annotated bounding boxes or image-level labels.

The computer-readable medium 312 may comprise a plurality of computer-readable mediums, each of which may be either a computer-readable storage medium or a computer-readable signal medium. The computer-readable medium 312 may reside, for example, within the input device(s) 304, the non-volatile memory 308, the volatile memory 310, or any combination thereof. The computer-readable medium 312 can include tangible media that is able to store the machine-readable instruction set associated with, or used by, the computer system 300. The computer-readable medium 312 includes, by way of non-limiting examples: RAM, ROM, cache, fiber optics, EPROM/Flash memory, CD/DVD/BD-ROM, hard disk drives, solid-state storage, optical or magnetic storage devices, diskettes, electrical connections having a wire, or any combination thereof. The computer-readable medium 312 may also include, for example, a system or device that is of a magnetic, optical, semiconductor, or electronic type. The computer-readable medium 312 is non-transitory, and excludes propagated signals and carrier waves.

The computer system 300 is communicatively coupled to a communication network 316 having different channels of communication by way of the network interface 314. The components of the computer system 300 may be physically coupled or may be communicatively and operably coupled through the communication path 305 and/or the communication network 316. The communication network 316 is communicatively connected to an edge server 360 (such as the edge servers 140, 150 in FIG. 1) which is further communicatively connected to a local server 370 (such as the local server 130 in FIG. 1).

The communication network 316 may include a first channel for V2V (vehicle-to-vehicle) communication for receiving data from and transmitting data to other vehicles and a second channel for V2X (vehicle-to-everything) communication for receiving data from and transmitting data to a law enforcement server 320 as well as other infrastructural entities such as, but not limited to, a traffic light, a street light, a home security camera, a roadside camera, and a mobile phone of a user, as discussed above. The V2V and V2X communication channels may be part of a larger communication system having a plurality of nodes, where individual vehicles 112, 116, 118, 122, 124, etc. and infrastructural entities act as nodes (collectively the data sources 350), such as that implemented by the National Highway Traffic Safety Administration (NHTSA) as part of new Federal Motor Vehicle Safety Standard (FMVSS) 150. As a non-limiting example, the nodes may form a mesh network and connect dynamically on an ad-hoc basis. In this way, vehicles and/or infrastructural entities may enter and/or leave the network at will, such that the mesh network may self-organize and self-modify over time.

Further, the communication network 316 may have a third channel of a wide area network, a local area network, a personal area network, a cellular network, a satellite network, and the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM. In some embodiments, the communication network 316 connects the computer system 300 with a mobile device 318 of a registered user of the individual vehicles 112, 116, 118, 122, 124, etc. such that the registered user can receive output from the computer system 300, such as information about the perpetrator 114. In different embodiments, the mobile device 318 may be a mobile phone, a tablet, a portable computer, or a remote computing device.

The communication equipment 324 includes a dedicated short-range communications (DSRC) communication transceiver (not shown) for sending and/or receiving radio signals in a 75 MHz band around 5.9 GHz in device-to-device (D2D) communication such as those implemented by the IEEE 802.11p DSRC standard as required by the V2V communication network 614 under FMVSS 150. The increased transmit power allowed in the 802.11p standard enables longer range communications. A connection between vehicles may utilize sessions that are time and/or location-based. The communication equipment 324 may also include, among other components, an antenna, a modem, LAN port, Wi-Fi card, WiMax card, mobile communications hardware, near-field communication hardware, satellite communication hardware and/or any wired or wireless hardware for communicating with other networks and/or vehicles.

The sensors 326 may include cameras (for example, the camera 112a in the vehicle 112) as well as the other kinds of sensors such as, but not limited to, an infrared sensor, a LIDAR (LIght Detection And Ranging) sensor, an impact sensor (for example, a glass breakage detector, unauthorized entry detector, etc.) and a proximity sensor. The sensors 326 are configured to detect the vehicle break-in and monitor the activities of the perpetrator 114 when the perpetrator 114 is within sensing distance. The navigation device 328 is a device for tracking location of the respective individual vehicles 112, 116, 118, 122, 124, and following a route to a destination, when the respective individual vehicles 112, 116, 118, 122, 124, are in motion.

The database 330 is configured to store data used for tracking the perpetrator 114. The database 330 includes an in-vehicle data module 332, a crowdsourced data module 334, and an integrated data set module 336. The in-vehicle data module 332 stores data received from the sensors 326, while the crowdsourced data module 334 stores data received from the plurality of data sources 350 within individual sensor networks 110, 120, etc. The crowdsourced data module 334 may share the crowdsourced data with the plurality of data sources through the communication network 316. The crowdsourced data module 334 may also share the crowdsourced data with a connected-vehicle cloud server 380 through which vehicles of same make can share crowdsourced data. The integrated data set module 336 includes a combined set of data formed by integrating the in-vehicle data received from the sensors 326 and the crowdsourced data received from the plurality of data sources within individual sensor networks 110, 120, etc. The data in the integrated data set module 336 is used by the computer system 300 to track the perpetrator 114.

FIG. 4 depicts a schematic process for crowdsourcing data for tracking the perpetrator 114 and reconstructing a 3D tracking image of the path taken by the perpetrator 114. As a non-limiting example of the crowdsourcing process, the vehicles 112, 116, 118 and the street light 180 may capture images of the perpetrator 114 using the sensors 326 (for example, the camera 116a in the vehicle 116) in each of them when the perpetrator 114 is in the first sensor network 110. Similarly, the vehicles 122, 124 and the street light 190 may capture images of the perpetrator 114 using the sensors 326 (for example, the camera 124a in the vehicle 124) in each of them when the perpetrator 114 is in the second sensor network 120. The recorded sensor readings of the vehicles 112, 116, 118, 122, 124 and the street lights 180, 190 are processed using one or more image processing algorithms (described above) and synchronized by a universal clock time. The processed images are then uploaded to the edge servers 140, 150 of the respective sensor networks 110, 120. The processed images include information from different perspectives of both the perpetrator 114 and the environment around the perpetrator 114.

The processed images are then transmitted by the edge servers 140, 150 to the local server 130, where the images from the different data sources 350 (vehicles 112, 116, 118, 122, 124 and the street lights 180, 190 in this example) are matched using co-visible objects/regions to reconstruct the three-dimensional (3D) environment through which the perpetrator 114 is fleeing. When reconstructing the 3D environment of the co-visible objects/regions, techniques including the stereoscopic vision may be employed. Specifically, the global coordinates for the entire environment may be built based on the 3D information for the co-visible objects/regions and the GPS information associated with sensors 326 of the individual data sources 350. A set of integrated images are formed as a result of the image matching.

The set of integrated images cooperatively helps in localizing the perpetrator 114 as well as the direction of his movement. The set of integrated images becomes larger and increases predictive accuracy of localizing the perpetrator 114 with the availability of images from additional data sources 350. The information on detected location and direction of movement of the perpetrator 114 may then be transmitted as feedback from the local server 130 to the vehicle 112 which had been broken in, the mobile device 318 of the registered user of the vehicle 112, and the law enforcement server 320. In some embodiments, the steps of image matching for reconstruction of the 3D environment and formation of the set of integrated images may be performed in the edge servers 140, 150 and then uploaded to the local server 130, rather than in the local server 130.

Figure 5:
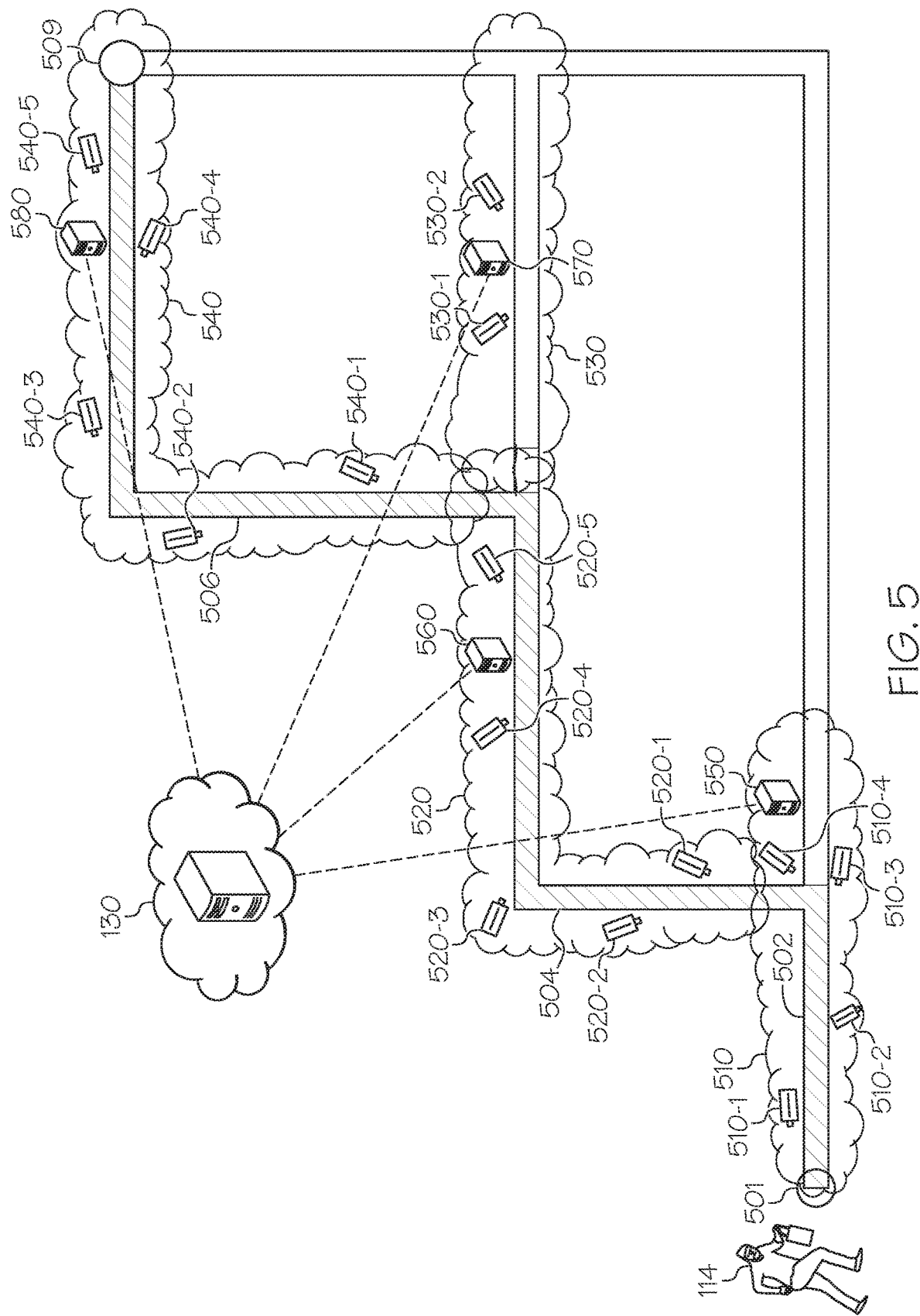
FIG. 5 depicts a handover process while crowdsourcing data for tracking the perpetrator after the vehicle break-in, according to one or more embodiments shown and described herein.

FIG. 5 depicts a handover process while crowdsourcing data for tracking the perpetrator 114 after the vehicle break-in. In the non-limiting example shown in FIG. 5, the sensor networks 510, 520, 530, 540 are formed based on the sensors 326 available for capturing movement of the perpetrator 114. Individual sensor networks 510, 520, 530, 540 include one or more cameras available for capturing images of the perpetrator 114 and uploading them to the respective edge servers 550, 560, 570, 580. While FIG. 5 depicts four sensor networks 510, 520, 530, 540, more or less than four sensor networks may be formed depending on distances among the cameras. The local server 130 or the respective edge servers 550, 560, 570, 580 may receive information of the vehicle break-in and then determine whether the perpetrator 114 is within sensing distance of at least one of the cameras in the sensor networks 510, 520, 530, 540 as the perpetrator 114 flees the scene following paths 502, 504, 506 from an initial position 501 to a final position 509.

When the perpetrator 114 is at the initial position 501, the camera 510-1 may initiate capturing images of the perpetrator 114 and uploading them to the edge server 550 for the sensor network 510 or the local server 130. As the perpetrator 114 passes the camera 510-1 along the path 502, the camera 510-3 may capture images of the perpetrator 114 and transmit to the edge server 550 or the local server 130. Then, as the perpetrator 114 turns towards the path 504, the local server 130 or the edge server 560 of the sensor network 520 may determine that the perpetrator 114 is within sensing distance of the camera 520-1 of the sensor network 520. At this time, a handover is implemented between the sensor network 510 and the sensor network 520. The camera 520-1 then captures images of the perpetrator 114 and transmits to the edge server 560 or the local server 130 and is followed by the camera 520-2.

As the perpetrator 114 then turns towards the path 506, the local server 130 or the edge server 580 of the sensor network 540 may determine that the perpetrator 114 is moving away from the camera 530-1 in the sensor network 530 and towards the camera 540-1 in the sensor network 540. At that time, an appropriate handover is implemented between the sensor network 520 and the sensor network 540. In this way, at least one camera in the sensor networks 510, 520, 540 captures images of the perpetrator 114 in real time and transmits to the respective edge servers 550, 560, 580 or the local server 130. In some embodiments, the cameras within the sensor networks 510, 520, 540 may store the captured images for a predetermined time, perform initial screening or processing of the images before uploading them to the respective edge servers 550, 560, 580 or the local server 130.

Figure 6:
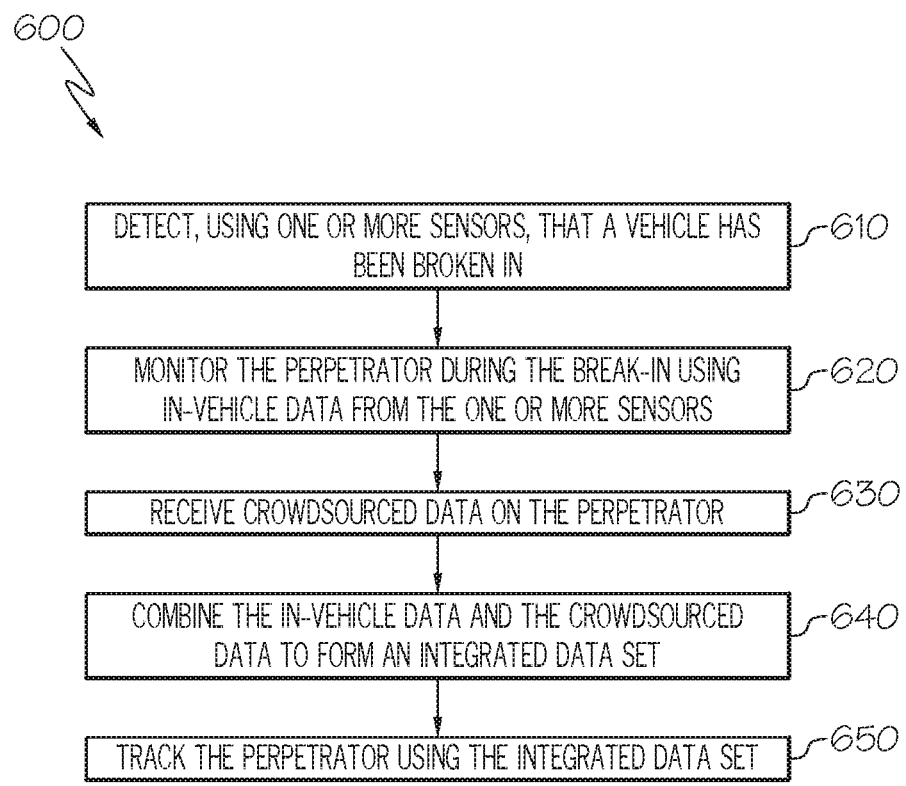
FIG. 6 depicts a flow chart of a method performed by the computer system of FIG. 3, according to one or more embodiments shown and described herein.

FIG. 6 depicts a flow chart 600 of a method performed by the computer system 300 of FIG. 3 in the vehicle 112 that is broken in. During operation, in block 610, the computer system 300 detects, using one or more sensors that a vehicle has been broken in. In the non-limiting embodiment shown in FIGS. 1-2, the camera 112a as well as the other kinds of sensors (collectively sensors 326) in the vehicle 112 may detect the break-in of the vehicle 112. In block 620, the computer system 300 monitors the perpetrator during the break-in using in-vehicle data from the one or more sensors. The sensors 326 capture images and other information of the perpetrator 114 at time $t_1$ during the vehicle break-in, accumulates in-vehicle data based on them and tracks the perpetrator 114 using the in-vehicle data.

In block 630, the computer system 300 receives crowdsourced data on the perpetrator. In some embodiments, the crowdsourced data is automatically received by the vehicle 112. In other embodiments, the vehicle 112 provides information about the break-in to edge server 140 or the local server 130 and requests the crowdsourced data on the perpetrator 114. The information provided may include time of the break-in, location of the vehicle 112, and one or more among the make, model, and color of the vehicle 112.

As shown in FIG. 2, the sensors of the plurality of data sources 350 such as, but not limited to the cameras 116a, 118a, and 180a in the first sensor network 110 may capture images of the perpetrator 114 at time to before the perpetrator 114 breaks into the vehicle 112 when the perpetrator 114 is within sensing distance, at time $t_1$ during the vehicle break-in and at time $t_2$ after the vehicle break-in as the perpetrator 114 flees the scene but still remains within sensing distance. As the perpetrator 114 crosses over from the first sensor network 110 to the second sensor network 120, a handover (described with regard to FIG. 5) is implemented from the first sensor network 110 to the second sensor network 120 and the plurality of data sources 350 such as, but not limited to the cameras 122a, 124a, and 190a in the second sensor network 120 may capture images of the perpetrator 114 as the perpetrator 114 comes within sensing distance. The images may be constantly and/or simultaneously captured from different perspectives and transmitted to the respective edge servers 140, 150, which may then transmit them to the local server 130.

In different embodiments, the edge servers 140, 150 and/or the local server 130 may synthesize, combine and process the images into a format that can be used as needed. The images help detect location and direction of movement of the perpetrator 114 and includes information on the path taken by the perpetrator 114 before and after the break-in. For example, the path taken by the perpetrator 114 is captured by sensors of a plurality of data sources 350 in different sensor networks before the perpetrator arrives within sensing distance of the sensors of a plurality of data sources in the first sensor network 110. Similarly, the path taken by the perpetrator 114 may be captured by sensors of a plurality of data sources 350 in different sensor networks after the perpetrator 114 leaves sensing distance of the sensors of a plurality of data sources 350 in the second sensor network 120. The information captured by the plurality of data sources 350 is processed (described with regard to FIG. 4) and provided as crowdsourced data to the computer system 300 in the vehicle 112.

In block 640, the computer system 300 combines the in-vehicle data and the crowdsourced data to form an integrated data set. The integrated data set includes information on the path taken by the perpetrator before and after the break-in as well as his activities during the vehicle break-in. In block 650, the computer system 300 tracks the perpetrator using the integrated data set. The tracking process is continual as the computer system 300 in the vehicle 112 continually receives crowdsourced data from the plurality of data sources 350.

In some embodiments, the crowdsourced data may be provided to law enforcement through the law enforcement server 320, particularly information such as, but not limited to, time of the break-in, location of the vehicle 112, and one or more among the make, model, and color of the vehicle 112, one or more images and last-known location of the perpetrator 114. In some embodiments, the crowdsourced data may be provided to a registered user of the vehicle 112 through a mobile device 318, particularly information such as, but not limited to, time of the break-in, location of the vehicle 112, and one or more among the make, model, and color of the vehicle 112, one or more images and last-known location of the perpetrator 114. In some embodiments, the crowdsourced data may be uploaded to a connected-vehicle cloud server 380 and shared among vehicles of the same make, as described above.

The systems described herein can be advantageously used to monitor and track, using crowdsourced data, a perpetrator responsible for breaking into a vehicle before, during, and after the time of break-in. Accordingly, the perpetrator can be identified and a notification sent to law enforcement or a registered user of the vehicle so that appropriate action may be undertaken.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter.

Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A computer-implemented method comprising:
    detecting, using one or more sensors, that a vehicle has been broken in;
    monitoring a perpetrator during the break-in using in-vehicle data from the one or more sensors;
    receiving crowdsourced data on the perpetrator; and
    reconstructing a three-dimensional tracking image of a path taken by the perpetrator based on a combination of the in-vehicle data and the crowdsourced data on the perpetrator;
    wherein reconstructing the three-dimensional tracking image of the path taken by the perpetrator further comprises processing the in-vehicle data and the crowdsourced data on the perpetrator using an image processing algorithm to generate processed images of the perpetrator and synchronizing the processed images with a universal clock time.

2. The computer-implemented method of claim 1, wherein the step of monitoring the perpetrator during the break-in comprises the steps of:
    accumulating the in-vehicle data during the break-in; and
    tracking the perpetrator, using the in-vehicle data.

3. The computer-implemented method of claim 1, wherein the crowdsourced data comprises: information on the path taken by the perpetrator before and after the break-in.

4. The computer-implemented method of claim 1, wherein the crowdsourced data is received from at least one of a plurality of data sources located within a threshold radius of the vehicle, the plurality of data sources comprising: vehicles, infrastructural entities, edge servers, and local servers.

5. The computer-implemented method of claim 4, wherein the infrastructural entities comprise one or more of: a traffic light, a street light, a home security camera, a roadside camera, and a mobile phone of a user.

6. The computer-implemented method of claim 1, wherein the step of receiving crowdsourced data on the perpetrator further comprises the step of:
    providing time of the break-in, location of the vehicle, and one or more of the following: make of the vehicle, model of the vehicle, and color of the vehicle; and
    requesting the crowdsourced data on the perpetrator.

7. The computer-implemented method of claim 1 further comprising the step of:
    providing law enforcement with the time of the break-in, the location of the vehicle, and one or more of the following: make of the vehicle, model of the vehicle, and color of the vehicle, one or more images of the perpetrator, and last-known location of the perpetrator.

8. The computer-implemented method of claim 1 further comprising the step of:
    providing a registered user of the vehicle with the time of the break-in, the location of the vehicle, and one or more of the following: one or more images of the perpetrator, and last-known location of the perpetrator.

9. The computer-implemented method of claim 1, wherein the crowdsourced data is shared on a cloud server by vehicles of same make.

10. The method of claim 1, wherein the three-dimensional tracking image of the path taken by the perpetrator is built using GPS information associated with the one or more sensors, the in-vehicle data, the crowdsourced data, or a combination thereof.

11. The method of claim 1, further comprising detecting a detected location and a direction of movement of the perpetrator based on the three-dimensional tracking image and transmitting the detected location and the direction of movement of the perpetrator to the vehicle.

12. A system of tracking a perpetrator of a break-in in a vehicle, the system comprising:
 a vehicle comprising:
  one or more sensors configured to detect the break-in; and
  a computing device comprising:
   a processor;
   a non-transitory computer readable memory; and
   a machine-readable instruction set stored in the non-transitory computer-readable memory that, when executed by the processor, causes the system to perform at least the following steps:
    detecting, using one or more sensors, that the vehicle has been broken in;
    monitoring the perpetrator during the break-in using in-vehicle data from the one or more sensors;
    receiving crowdsourced data on the perpetrator; and
    reconstructing a three-dimensional tracking image of a path taken by the perpetrator based on a combination of the in-vehicle data and the crowdsourced data on the perpetrator;
wherein reconstructing the three-dimensional tracking image of the path taken by the perpetrator further comprises processing the in-vehicle data and the crowdsourced data on the perpetrator using an image processing algorithm to generate processed images of the perpetrator and synchronizing the processed images with a universal clock time.

13. The system of claim 12 further comprising:
 a plurality of data sources located within a threshold radius of the vehicle and configured to provide the crowdsourced data, the plurality of data sources comprising:
 vehicles, infrastructural entities, edge servers, and local servers.

14. The system of claim 13, wherein the infrastructural entities comprise one or more of: a traffic light, a street light, a home security camera, a roadside camera, and a mobile phone of a user.

15. The system of claim 13, wherein the three-dimensional tracking image of the path taken by the perpetrator is built using GPS information associated with the one or more sensors and the plurality of data sources.

16. The system of claim 12, wherein the machine-readable instruction set when executed by the processor, causes the system to monitor the perpetrator during the break-in by:
 accumulating the in-vehicle data during the break-in; and
 tracking the perpetrator, using the in-vehicle data.

17. The system of claim 12, wherein the crowdsourced data comprises: information on the path taken by the perpetrator before and after the break-in.

18. The system of claim 12, wherein the machine-readable instruction set when executed by the processor, causes the system to receive crowdsourced data on the perpetrator by:
 providing time of the break-in, location of the vehicle, and one or more of the following: make of the vehicle, model of the vehicle, and color of the vehicle; and
 requesting the crowdsourced data on the perpetrator.

19. The system of claim 12, wherein the machine-readable instruction set when executed by the processor, further causes the system to perform the step of:
 providing law enforcement with the time of the break-in, the location of the vehicle, and one or more of the following: make of the vehicle, model of the vehicle, and color of the vehicle, one or more images of the perpetrator, and last-known location of the perpetrator.

20. The system of claim 12, wherein the machine-readable instruction set when executed by the processor, further causes the system to perform the step of:
 providing a registered user of the vehicle with the time of the break-in, the location of the vehicle, and one or more of the following: one or more images of the perpetrator, and last-known location of the perpetrator.

21. The system of claim 12 further comprising:
 a cloud server communicatively coupled to the computing device, the cloud server configured to share the crowdsourced data from vehicles of same make.

* * * * *